US012039915B2

(12) United States Patent
Wei et al.

(10) Patent No.: US 12,039,915 B2
(45) Date of Patent: Jul. 16, 2024

(54) DISPLAY DRIVE CIRCUIT AND METHOD, LED DISPLAY BOARD AND DISPLAY DEVICE

(71) Applicant: XI'AN TIBORS ELECTRONIC TECHNOLOGY CO., LTD., Shaanxi (CN)

(72) Inventors: Ke Wei, Shaanxi (CN); Defu Liu, Shaanxi (CN); Huorong Wang, Shaanxi (CN); Jingguo Zong, Shaanxi (CN)

(73) Assignee: XI'AN TIBORS ELECTRONIC TECHNOLOGY CO., LTD., Shaanxi (CN)

( * ) Notice: Subject to any disclaimer, the term of this patent is extended or adjusted under 35 U.S.C. 154(b) by 0 days.

(21) Appl. No.: 18/015,845

(22) PCT Filed: Jul. 29, 2020

(86) PCT No.: PCT/CN2020/105425
§ 371 (c)(1),
(2) Date: Jan. 12, 2023

(87) PCT Pub. No.: WO2022/021123
PCT Pub. Date: Feb. 3, 2022

(65) Prior Publication Data

US 2023/0267875 A1 Aug. 24, 2023

(51) Int. Cl.
*G09G 3/32* (2016.01)

(52) U.S. Cl.
CPC ....... *G09G 3/32* (2013.01); *G09G 2310/0286* (2013.01); *G09G 2310/0291* (2013.01);
(Continued)

(58) Field of Classification Search
CPC ...... G09G 3/32; G09G 3/3275; G09G 3/3283; G09G 3/3233
See application file for complete search history.

(56) References Cited

U.S. PATENT DOCUMENTS 11,132,940 B2 * 9/2021 Yen ...................... G09G 3/2003
11,393,391 B2 * 7/2022 Lu ........................... G09G 3/32
(Continued)

FOREIGN PATENT DOCUMENTS

CN 101930349 A 12/2010
CN 102708803 A 10/2012
(Continued)

*Primary Examiner* — Sardis F Azongha
(74) *Attorney, Agent, or Firm* — Meunier Carlin & Curfman LLC

(57) ABSTRACT

The display drive circuit includes: an interface circuit for acquiring a plurality of grayscale data and a plurality of current gain data; a command processing circuit electrically coupled with the interface circuit; a cache circuit electrically coupled with the interface circuit and configured for caching the plurality of grayscale data and the plurality of current gain data; a current source circuit electrically coupled with the command processing circuit and including a plurality of channel current sources; a channel grayscale control circuit, electrically coupled with the command processing circuit, the cache circuit and the current source circuit, and configured for respectively controlling duration of turning on of the plurality of channel current sources according to the plurality of grayscale data; and a channel current control circuit electrically coupled with the cache circuit and the current source circuit, and configured for respectively controlling output currents of the plurality of channel current sources.

19 Claims, 6 Drawing Sheets

(52) U.S. Cl.
CPC ............... *G09G 2320/0233* (2013.01); *G09G 2320/0271* (2013.01); *G09G 2360/121* (2013.01)

(56) References Cited

U.S. PATENT DOCUMENTS

| | | | |
|---|---|---|---|
| 2009/0108768 | A1 | 4/2009 | Yang |
| 2022/0130323 | A1 | 4/2022 | Lu |

FOREIGN PATENT DOCUMENTS

| | | | | |
|---|---|---|---|---|
| CN | 102779480 | A | | 11/2012 |
| CN | 109147653 | A | | 1/2019 |
| CN | 208580563 | U | | 3/2019 |
| CN | 110191536 | A | | 8/2019 |
| CN | 110277052 | A | * | 9/2019 |
| CN | 110277052 | A | | 9/2019 |
| JP | H07319427 | A | | 12/1995 |
| WO | 2008099979 | A2 | | 8/2008 |

* cited by examiner

DISPLAY DRIVE CIRCUIT AND METHOD, LED DISPLAY BOARD AND DISPLAY DEVICE

CROSS REFERENCE TO RELATED APPLICATION

This application is a National Stage Application of International Patent Application No. PCT/CN2020/105425, with an international filing date of Jul. 29, 2020. The contents of all of the aforementioned application, including any intervening amendments thereto, are incorporated herein by reference.

FIELD

The present application relates to the technical field of display controlling, and more particularly to a display drive circuit, an LED display board, a display device, and a display drive method.

BACKGROUND

At present, Light Emitting Diode (LED) display devices have been applied to various fields due to the low cost, low power consumption, high visibility, free assembly and other advantages. At the same time, with the popularization of the application of LED display devices, people have increasingly high requirements for their display quality, therefore how to improve the display quality of LED display devices has become a research focus in the field.

With more and more LED application scenarios, the brightness adjustability and universality of the LED re more and more concerned. The LED can be used for outdoor high brightness screens and indoor low brightness conference screens; More and more customers need LED display devices to adjust the brightness according to their own needs. An existing sixteen output channel Pulse Width Modulation (PWM) type LED display drive chip based on grayscale clock signal GCLK, whose channel control circuit typically includes a plurality of comparators corresponding to the sixteen output channels, a plurality of current sources corresponding to the sixteen output channels, an output buffer electrically coupled between the plurality of comparators and the plurality of current sources and a global current gain regulator electrically coupled with the plurality of current sources. Because PWM drive control mode is used, and the brightness of the LED display device applied is between 1000-20000 nits, and the 16 bits grayscale data can only be displayed at 10-14 bits, it is difficult to effectively improve the display bit depth by relying solely on PWM drive control mode. Moreover, with the gradual popularization of small pitch LED display devices, the brightness of indoor small pitch LED display devices is generally controlled between 100-1000 nits. However, the existing PWM LED display driver chips, in some scenes where LED brightness needs to be dimmed, since the low grayscale data in built-in grayscale dispersion algorithm of the LED display driver chips often only appears once for a short time, which usually leads to problems such as uneven grayscale transition under low brightness and low grayscale or low grayscale refresh rate.

SUMMARY

In order to overcome at least some defects and deficiencies in the prior art, the embodiments of the present application provide a display drive circuit, an LED display board, a display device, and a display drive method.

Specifically, an embodiment of the present application provides a display drive circuit, which includes: an interface circuit configured for acquiring a plurality of grayscale data and a plurality of current gain data; a command processing circuit electrically coupled with the interface circuit; a cache circuit electrically coupled with the interface circuit and configured for caching the plurality of grayscale data and the plurality of current gain data; a current source circuit electrically coupled with the command processing circuit and including a plurality of channel current sources; a channel grayscale control circuit, electrically coupled with the command processing circuit, the cache circuit and the current source circuit, and configured for respectively controlling duration of turning on of the plurality of channel current sources according to the plurality of grayscale data; and a channel current control circuit electrically coupled with the cache circuit and the current source circuit, and configured for respectively controlling output currents of the plurality of channel current sources according to the plurality of current gain data.

By designing the display drive circuit, the embodiment of the present application can obtain the grayscale data and current gain data, the duration of turning on of each channel current source based on the grayscale data can be controlled, and the output current of each channel current source based on the current gain data can be controlled, therefore the dynamic adjustment of channel current can be realized. In this way, the grayscale data can be improved by reducing the output current (the drive current of the corresponding display point), that is, the display bit depth can be improved. Moreover, since the display effect of the LED display device is related to the refresh rate and the drive current of each grayscale, the grayscale refresh rate under low brightness and low grayscale can be effectively improved by reducing the drive current of display points, such as LED light points, and increasing grayscale data at low grayscale. In addition, by reducing the output current and increasing the grayscale data, the desired brightness value can be accurately obtained, thereby improving the display accuracy of the entire LED display device under low grayscale, so as to solve the problem of uneven grayscale transition under low grayscale.

In an embodiment of the present application, the interface circuit includes a shift register circuit and is configured for accessing a data clock signal, a latch signal and a serial data; the shift register circuit is configured for receiving the serial data to obtain the plurality of grayscale data and the plurality of current gain data and to receive controlling of the data clock signal and the latch signal; the command processing circuit is electrically coupled with the shift register circuit and receives controlling of the data clock signal and the latch signal; the cache circuit is electrically coupled with the shift register circuit to obtain the plurality of grayscale data and the plurality of current gain data; and the channel grayscale control circuit receives controlling of the data clock signal. The interface circuit of the embodiment can realize the serial input and output of grayscale data and current gain data, which is conducive to the cascade of the plurality of display drive circuits; and the channel grayscale control circuit receives the controlling of the data clock signal, which is beneficial to reduce the number of input ports of the interface circuit.

In an embodiment of the present application, the channel grayscale control circuit includes: a counter electrically coupled with the command processing circuit and configured for receiving a grayscale clock signal and generating a grayscale clock count value under controlling of the grayscale clock signal; a grayscale dispersion processing circuit electrically coupled with the command processing circuit and the counter, and configured for receiving controlling of the command processing circuit to control a counting operation of the counter and generate a grayscale grouping control signal; an output buffer electrically coupled with the plurality of channel current sources of the current source circuit; and a plurality of comparators electrically coupled with the cache circuit, the counter, the grayscale dispersion processing circuit and the output buffer, and configured for obtaining the plurality of grayscale data from the cache circuit respectively, and generating a plurality of grayscale display control signals under controlling of the grayscale clock count value and the grayscale grouping control signal, and the plurality of grayscale display control signals are transmitted to the plurality of channel current sources through the output buffer. In the embodiment, the use of the grayscale dispersion processing circuit is conducive to evenly disperse the high grayscale part and the low grayscale part, so that in some scenes where the grayscale realization is incomplete, and most grayscale can be realized as much as possible.

In an embodiment of the present application, the channel grayscale control circuit further includes a frequency multiplication circuit electrically coupled with the counter and configured for generating the grayscale clock signal and transmitting the grayscale clock signal to the counter. In the embodiment, the use of frequency multiplication circuit is conducive to increase the flexibility of the generation of the grayscale clock signal.

In an embodiment of the present application, the current source circuit further includes a plurality of color component global current gain adjusters, and each color component global current gain adjuster is electrically coupled with a plurality of channel current sources configured for carrying a same color sub-pixel in the plurality of channel current sources; the channel current control circuit comprises a plurality of channel current gain adjusters, and the plurality of channel current gain adjusters are respectively electrically coupled with the plurality of channel current sources and respectively receive controlling of the plurality of current gain data. In the embodiment, the arrangement of the color component global current gain adjuster is conducive to the global adjustment of channel current source with the same color sub-pixel.

In an embodiment of the present application, the interface circuit includes a shift register circuit and is configured for accessing a data clock signal, a latch signal, a serial data and a second clock signal different from the data clock signal; the shift register circuit is configured for receiving the serial data to obtain the plurality of grayscale data and the plurality of current gain data and to receive controlling of the data clock signal and the latch signal; the command processing circuit is electrically coupled with the shift register circuit and receives controlling of the data clock signal and the latch signal; the cache circuit is electrically coupled with the shift register circuit to obtain the plurality of grayscale data and the plurality of current gain data; and the channel grayscale control circuit receives controlling of the second clock signal. The interface circuit of the embodiment can realize the serial input and output of grayscale data and current gain data, which is conducive to the cascade of the plurality of display drive circuits; and the channel grayscale control circuit receives the controlling of the second clock signal different from the data clock signal, which can make the generation of the grayscale clock signal no longer limited to the data clock signal, and improve the flexibility of the generation of the grayscale clock signal.

In an embodiment of the present application, the display drive circuit further includes a scanning control circuit electrically coupled with the channel grayscale control circuit and configured for generating a plurality of row scanning signals in sequence. In the embodiment, by integrating the scanning control circuit, which can effectively improve the integration of the display drive circuit, and reduce the complexity of PCB design when designing LED display boards.

In an embodiment of the present application, the cache circuit includes a grayscale data storage region and a current gain data storage region, the grayscale data storage region is configured for caching the plurality of grayscale data, and the current gain data storage region is configured for caching the plurality of current gain data. In the embodiment, the grayscale data and the current gain data are stored separately, which is conducive to simplifying data reading and writing operations.

In an embodiment of the present application, the grayscale data storage region includes two storage sub-regions configured for caching grayscale data frame-by-frame in a ping-pong storage mode, and the current gain data storage region includes two storage sub-regions configured for caching current gain data frame-by-frame in the ping-pong storage mode. In the embodiment, the grayscale data and the current gain data are stored in a ping-pong storage mode, which is conducive to improving the processing speed and performance of the display drive circuit.

In an embodiment of the present application, the interface circuit, the command processing circuit, the cache circuit, the current source circuit, the channel grayscale control circuit, and the channel current control circuit are integrated in a same chip. In the embodiment, the circuits are integrated into the same chip, that is, the display drive circuit is integrated into a chip, which is conducive to improving the integration of the display drive circuit.

In an embodiment of the present application, the plurality of current gain data are point-by-point current gain data, so that a same channel current source in the plurality of channel current sources uses the current gain data corresponding to different display points when the different display points are driven. The point-by-point current gain data of the embodiment is conducive to improving the precision of current dynamic adjustment.

In an embodiment of the present application, the plurality of current gain data are channel-by-channel current gain data, so that the current gain data used by a same channel current source in the plurality of channel current sources in different display frames are different. The using of the channel-by-channel circuit gain data in the embodiment can at least realize frame-by-frame current dynamic adjustment.

Further, an embodiment of the present application provides an LED display board, which includes: a pixel array including a plurality of pixel points, and each pixel point includes a plurality of LEDs with different colors; and at least one display drive circuit according to any one of above embodiments, and the plurality of channel current sources of the display drive circuit are electrically coupled with the pixel array.

The LED display board of the embodiment can realize the dynamic adjustment of channel current, which is conducive to improving the display bit depth, improving the grayscale refresh rate under low brightness and low grayscale, and improving the display accuracy under low grayscale of the entire LED display device to solve the problem of uneven grayscale transition under low brightness and low grayscale.

Further, an embodiment of the present application provides a display device, which includes: a front-end display control card configured for outputting a plurality of grayscale data and a plurality of current gain data; and the LED display board mentioned above, and the display drive circuit of the LED display board is electrically coupled with the front-end display control card to receive the plurality of grayscale data and the plurality of current gain data.

The display device of the embodiment can realize the dynamic adjustment of channel current, which is conducive to improving the display bit depth, improving the grayscale refresh rate under low brightness and low grayscale, and improving the display accuracy under low grayscale of the entire LED display device to solve the problem of uneven grayscale transition under low brightness and low grayscale.

Further, an embodiment of the present application provides a display drive method, which includes steps of: obtaining a plurality of grayscale data and a plurality of current gain data; caching the plurality of grayscale data and the plurality of current gain data; respectively controlling duration of turning on of a plurality of channel current sources according to the plurality of grayscale data; and respectively controlling output currents of the plurality of channel current sources according to the plurality of current gain data.

The display drive method of the embodiment can realize the dynamic adjustment of channel current, which is conducive to improving the display bit depth, improving the grayscale refresh rate under low brightness and low grayscale, and improving the display accuracy under low grayscale of the entire LED display device to solve the problem of uneven grayscale transition under low brightness and low grayscale.

In an embodiment of the present application, the step of respectively controlling duration of turning on of a plurality of channel current sources according to the plurality of grayscale data includes: receiving a grayscale clock signal and generating a grayscale clock count value under controlling of the grayscale clock signal; controlling a counting operation of a counter and generating a grayscale grouping control signal based on a grayscale dispersion algorithm; and respectively obtaining the plurality of grayscale data, and generating a plurality of grayscale display control signals to be transmitted to the plurality of channel current sources respectively under controlling of the grayscale clock count value and the grayscale grouping control signal, to control the duration of turning on of the plurality of channel current sources. In the embodiment, the use of the grayscale dispersion processing circuit is conducive to evenly disperse the high grayscale part and the low grayscale part, so that in some scenes where the grayscale realization is incomplete, and most grayscale can be realized as much as possible.

In an embodiment of the present application, the step of respectively controlling duration of turning on of a plurality of channel current sources according to the plurality of grayscale data further includes: performing a frequency multiplication processing onto an input clock signal to generate the grayscale clock signal. In the embodiment, the use of frequency multiplication circuit is conducive to increase the flexibility of the generation of the grayscale clock signal.

In an embodiment of the present application, the step of respectively controlling output currents of the plurality of channel current sources according to the plurality of current gain data includes: respectively controlling the output currents of the plurality of channel current sources according to a plurality of point-by-point current gain data. The using of point-by-point current gain data in the embodiment can enable the current source of the same channel to use the current gain data corresponding to the different display points when different display points (such as LED light points) is driven, which is conducive to improving the accuracy of current dynamic adjustment.

In an embodiment of the present application, the step of caching the plurality of grayscale data and the plurality of current gain data includes: caching point-by-point grayscale data frame-by-frame in a ping-pong storage mode; and caching point-by-point current gain data frame-by-frame in the ping-pong storage mode. In the embodiment, the grayscale data and the current gain data are stored in a ping-pong storage mode, which is conducive to improving the processing speed and performance of the display drive circuit.

In an embodiment of the present application, the step of respectively controlling output currents of the plurality of channel current sources according to the plurality of current gain data includes: respectively controlling the output currents of the plurality of channel current sources according to a plurality of channel-by-channel current gain data. In an embodiment of the present application, the using of the channel-by-channel current gain data, so that the current gain data used by a same channel current source in the plurality of channel current sources in different display frames are different. The using of the channel-by-channel circuit gain data in the embodiment can at least realize frame-by-frame current dynamic adjustment.

The above technical solutions can have the following advantages or beneficial effects: by designing the display drive circuit, the embodiment of the present application can obtain the grayscale data and current gain data, the duration of turning on of each channel current source based on the grayscale data can be controlled, and the output current of each channel current source based on the current gain data can be controlled, therefore the dynamic adjustment of channel current can be realized. In this way, the grayscale data can be improved by reducing the output current (the drive current of the corresponding display point), that is, the display bit depth can be improved. Moreover, since the display effect of the LED display device is related to the refresh rate and the drive current of each grayscale, the grayscale refresh rate under low brightness and low grayscale can be effectively improved by reducing the drive current of display points, such as LED light points, and increasing grayscale data at low grayscale. In addition, by reducing the output current and increasing the grayscale data, the desired brightness value can be accurately obtained, thereby improving the display accuracy of the entire LED display device under low grayscale, so as to solve the problem of uneven grayscale transition under low grayscale.

BRIEF DESCRIPTION OF THE DRAWINGS

In order to more clearly explain the technical solution of the embodiments of the present application, the following will briefly introduce the drawings needed to be used in the description of the embodiments. Obviously, the drawings in the following description are only some embodiments of the present application. For ordinary technicians in the art, other drawings can be obtained from these drawings without paying creative labor.

DETAILED DESCRIPTION OF EMBODIMENTS

The technical solutions in the embodiments of the present application will be described clearly and completely below in combination with the drawings in the embodiments of the present application. Obviously, the described embodiments are only part of the embodiments of the present application, not all embodiments. Based on the embodiments in the present application, all other embodiments obtained by ordinary technicians in the art without doing creative work belong to the scope of protection in the present application.

The First Embodiment

Figure 1A:
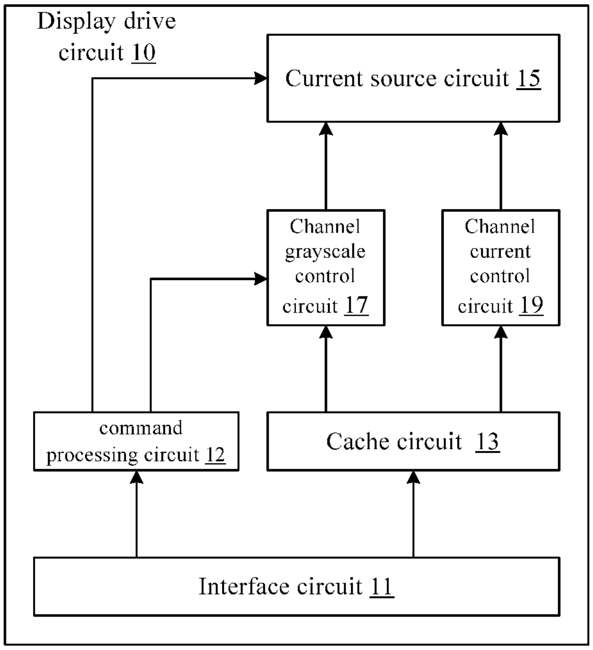
FIG. 1A is a structural schematic diagram of a display drive circuit in an embodiment of the present application.

FIG. 1A is a structural schematic diagram of a display drive circuit 10 provided by an embodiment of the present application. As shown in FIG. 1A, the display drive circuit 10 includes: an interface circuit 11, a command processing circuit 12, a cache circuit 13, a current source circuit 15, a channel grayscale control circuit 17, and a channel current control circuit 19.

The interface circuit 11 is configured for acquiring a plurality of grayscale data and a plurality of current gain data.

The command processing circuit 12 is electrically coupled with the interface circuit, and includes, for example, a configuration register and a circuit logic for responding to commands.

The cache circuit 13 is electrically coupled with the interface circuit 11 and configured for caching the plurality of grayscale data and the plurality of current gain data.

The current source circuit 15 is electrically coupled with the command processing circuit 12 and includes a plurality of channel current sources.

The channel grayscale control circuit 17 is electrically coupled with the command processing circuit 12, the cache circuit 13 and the current source circuit 15, and configured for respectively controlling duration of turning on of the plurality of channel current sources according to the plurality of grayscale data.

The channel current control circuit 19 is electrically coupled with the cache circuit 13 and the current source circuit 15, and configured for respectively controlling output currents of the plurality of channel current sources according to the plurality of current gain data.

By designing the display drive circuit 10, the embodiment of the present application can obtain the grayscale data and current gain data, the duration of turning on of each channel current source based on the grayscale data can be controlled, and the output current of each channel current source based on the current gain data can be controlled, therefore the dynamic adjustment of channel current can be realized. In this way, the grayscale data can be improved by reducing the output current (the drive current of the corresponding display point), that is, the display bit depth can be improved. Moreover, since the display effect of the LED display device is related to the refresh rate and the drive current of each grayscale, the grayscale refresh rate under low brightness and low grayscale can be effectively improved by reducing the drive current of display points, such as LED light points, and increasing grayscale data at low grayscale. In addition, by reducing the output current and increasing the grayscale data, the desired brightness value can be accurately obtained, thereby improving the display accuracy of the entire LED display device under low grayscale, so as to solve the problem of uneven grayscale transition under low grayscale. In addition, in the embodiment, the interface circuit 11, the command processing circuit 12, the cache circuit 13, the current source circuit 15, the channel grayscale control circuit 17, and the channel current control circuit 19 can be integrated into the same chip to improve the integration of the entire display drive circuit 10, but the present application is not limited to this.

Figure 1B:
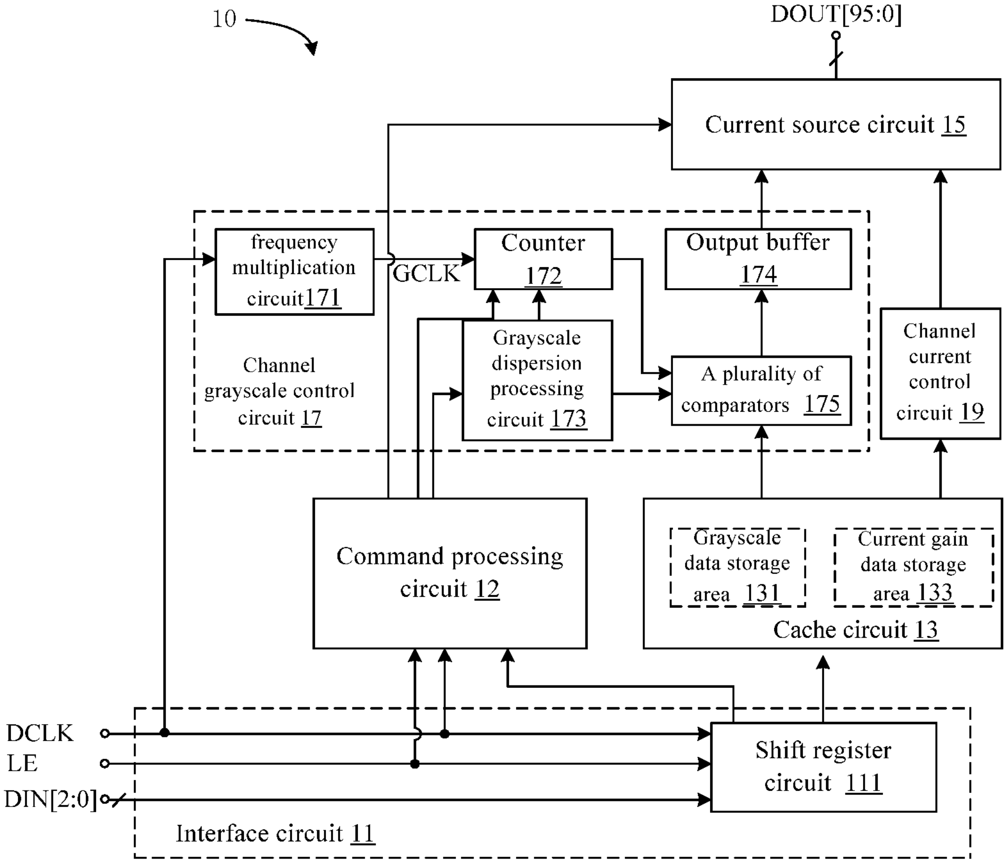
FIG. 1B is a specific structural schematic diagram of the display drive circuit shown in FIG. 1A.
Figure 1C:
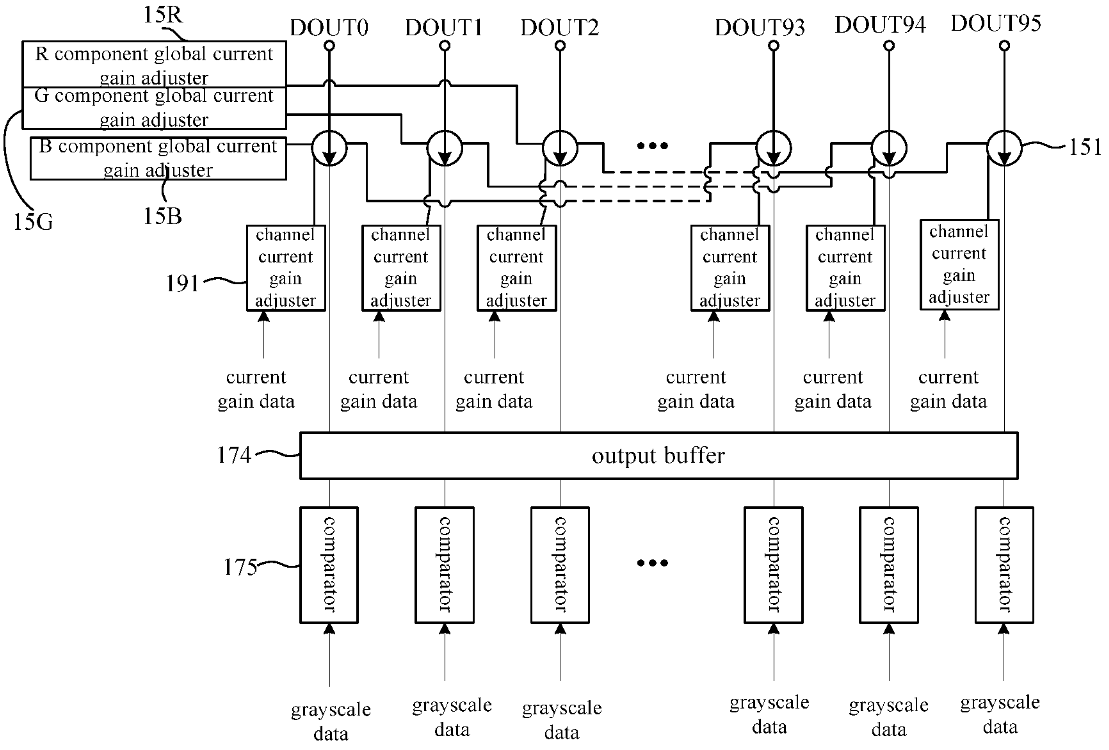
FIG. 1C is a specific structural schematic diagram of a current source circuit, a channel grayscale control circuit and a channel current control circuit in the display drive circuit shown in FIG. 1A.

More specifically, as shown in FIG. 1B and FIG. 1C, the interface circuit 11 includes, for example, a shift register circuit 111 and is configured to access a data clock signal DCLK, a latch signal LE and a serial data DIN [2:0]. The shift register circuit 111 is configured to receive the serial data to obtain the plurality of grayscale data and the plurality of current gain data, and to receive the controlling of the data clock signal DCLK and the latch signal LE. For example, the shift register circuit 111 of the embodiment includes a shift register and a circuit logic for command response and data transmission (such as DMA transmission). The DMA here is the abbreviation of Direct Memory Access.

The command processing circuit 12 is electrically coupled with the shift register circuit 111 and receives the controlling of the data clock signal DCLK and the latch signal LE. The cache circuit 13 is electrically coupled with the shift register circuit 111 to obtain the plurality of grayscale data and the plurality of current gain data. For example, the cache circuit 13 of the embodiment includes SRAM (Static Random Access Memory) buffer memory and RAM Controller. In an embodiment, the cache circuit 13 is configured with two independent storage regions, namely, the grayscale data storage region 131 and the current gain data storage region 133, to respectively store the plurality of grayscale data and the plurality of current gain data. Here, the grayscale data and current gain data are stored separately, which is conducive to simplifying data reading and writing operations. Further, each of the grayscale data storage region 131 and the current gain data storage region 133 is further divided into two storage sub-regions, which are used to cache grayscale data or current gain data frame-by-frame in a ping-pong storage mode; This kind of grayscale data and current gain data both use the ping-pong storage mode, which is conducive to improving the processing speed and performance of the display drive circuit 10. In addition, those skilled in the art can understand that grayscale data and current gain data can also be accessed using other storage modes, and the ping-pong storage is not used as a limitation here.

The channel grayscale control circuit 17 receives the controlling of the data clock signal DCLK, which includes, for example, a frequency multiplication circuit 171, a counter 172, a grayscale dispersion processing circuit 173, an output buffer 174, and a plurality of comparators 175.

The frequency multiplication circuit 171 is used for frequency multiplication processing of the data clock signal DCLK to obtain a grayscale clock signal GCLK. For example, the frequency multiplication circuit 171 of the embodiment includes a Phase Locked Loop (PLL) circuit or a PLL like circuit, which can generate a 160 MHZ grayscale clock signal GCLK via frequency multiplication processing, for example, but the embodiment is not limited to this. The frequency multiplication circuit 171 of the embodiment uses the data clock signal DCLK as the input clock signal to generate the grayscale clock signal GCLK, which can reduce the number of input ports of the display drive circuit 10.

The counter 172 is electrically coupled with the command processing circuit 12 and the frequency multiplication circuit 171 to receive the grayscale clock signal GCLK and generate the grayscale clock count value under the controlling of the grayscale clock signal GCLK. The counter 172 in the embodiment is mainly used for pulse counting of grayscale clock signal GCLK, which can be a 16-bit counter, but the embodiment is not limited to this. Furthermore, the counter 172 is configured by the command processing circuit 12. For example, when the grayscale clock count value is reset to 1024, the grayscale clock count value of the counter 172 reaches 1024, then the counter 172 is reset and the counting starts again; or when the grayscale clock count value is reset to 256, then the counter 172 is reset and the counting starts again, in addition, the grayscale clock count reset value in the embodiment is not limited to the values listed above.

The grayscale dispersion processing circuit 173 is electrically coupled with the command processing circuit 12 and the counter 172, for receiving the controlling of the command processing circuit 12, thereby the counting operation of the counter 172 is controlled to generate a grayscale grouping control signal. In the embodiment, the grayscale dispersion processing circuit 173 is, for example, a processing circuit capable of running the grayscale dispersion algorithm, typically including a memory storing the grayscale dispersion algorithm code and a processor electrically coupled with the memory and used to execute the grayscale dispersion algorithm code; the grayscale dispersion processing circuit 173 can generate a grayscale grouping display control signal according to the grayscale data dispersion mode configured for the command processing circuit 12 and the grayscale depth to be realized; the existing mature algorithm can be used for the grayscale dispersion algorithm, which will not be repeated here. Furthermore, taking the display drive circuit 10 applied to driving and controlling red, green and blue (RGB) full-color LED pixels as an example, the display control data of a single LED pixel includes red (R) component display control data, green (G) component display control data, and blue (B) component display control data, and the single color component display control data includes, for example, 16-bit grayscale data and 8-bit current gain data. For the 16-bit grayscale data, which can be divided into 64 grayscale groups according to the grayscale dispersion algorithm, and the grayscale of each grayscale group is 1024, so that $1024*64=65536=2^{16}$ grayscale values can be achieved through 64 grayscale groups; or, if the grayscale of a single grayscale group is set to 256, the display of 16-bit grayscale data needs to be divided into 256 grayscale groups; furthermore, the number of grayscale groups in the embodiment and the grayscale of a single grayscale group are not limited to the values listed above.

The output buffer 174 is electrically coupled with a plurality of channel current sources 151 of the current source circuit 15.

The plurality of comparators 175 are electrically coupled with the cache circuit 13, the counter 172, the grayscale dispersion processing circuit 173 and the output buffer 174, for obtaining the plurality of grayscale data from the cache circuit 13, respectively, and generating a plurality of grayscale display control signals under the controlling of the grayscale clock count value and the grayscale grouping control signal, the plurality of grayscale display control signals are transmitted to the plurality of channel current sources 151 via the output buffer 174, respectively, to control the duration of turning on of each channel current source 151. Taking the display drive circuit 10 as an LED display drive chip as an example, for example, which has 96 output channels DOUT [95:0], which can load/drive 96 rows of LED light points (display points). Taking three RGB LED light points consist of an LED pixel as an example, which can load 32 columns of RGB full-color LED pixels, that is, 96 output channels DOUT [95:0] can be divided into 32 red (R) component output channels, 32 green (G) component output channels and 32 blue (B) component output channels.

Furthermore, as shown in FIG. 1C, the current source circuit 15 includes the plurality of channel current source 151, for example, which further includes the R component global current gain adjuster 15R, the G component global current gain adjuster 15G and the B component global current gain adjuster 15B. The R component global current gain adjuster 15R is electrically coupled with a plurality of channel current sources used for loading red (R component) sub-pixels (or display point such as LED light point) in the plurality of channel current sources 151, and the G component global current gain adjuster 15G is electrically coupled with a plurality of channel current sources used for loading green (G component) sub-pixels in the plurality of channel current sources 151, and the B component global current gain adjuster 15B is electrically coupled with a plurality of channel current sources 151 for loading blue (B component) sub-pixels.

The channel current control circuit 19 includes a plurality of channel current gain adjusters 191, and the plurality of channel current gain adjusters 191 are respectively electrically coupled with the plurality of channel current sources 151, and receive the controlling of the plurality of current gain data.

Taking the 96 output channels DOUT [95:0] configured in the display drive circuit 10 in FIG. 1C as an example, the R component global current gain adjuster 15R is electrically coupled with 32 red output channels, such as DOUT2, . . . , DOUT95, in the 96 output channels DOUT [95:0], and the G component global current gain adjuster 15G is electrically coupled with 32 green output channels, such as DOUT1, . . . , DOUT94, in the 96 output channels DOUT [95:0], and the B component global current gain regulator 15G is electrically coupled with 32 blue output channels, such as DOUT0, . . . , DOUT93, in the 96 output channels DOUT [95:0]. The R component global current gain adjuster 15R, the G component global current gain adjuster 15G and the B component global current gain adjuster 15B can be respectively externally connected with resistors. The plurality of channel current gain adjusters 191 are 96 channel current gain adjusters, which receive the controlling of the corresponding current gain data to be responsible for the single channel current gain adjustment of the 96 output channels DOUT [95:0] respectively, and includes, for example, a resistance network controlled by the current gain data and electrically coupled with the corresponding channel current source 151 respectively. It can be understood that in practical applications, the three component global current gain regulators, namely, the R component global current gain regulator 15R, the G component global current gain regulator 15G, and the B component global current gain regulator 15B, can also be considered to be integrated into a global current gain regulator, so that a single global current gain regulator is responsible for the global current gain regulation of 96 output channels DOUT [95:0], that is, the global current gain adjustment does not distinguish between R, G, and B components. Even in some design modes, the current source circuit 15 can omit these global current gain regulators 15R, 15G, and 15B.

In order to better understand the display drive circuit 10 of the embodiment, the following will illustrate its working principle with reference to FIGS. 1A-1C.

When the display drive circuit 10 starts to power on normally, the data clock signal DCLK at the data clock input end sends the R, G, B component display control data in the serial data DIN [2:0] input at the serial data input end to the shift register circuit 111. The display drive circuit 10 collects 3-bit display control data at the rising edge of each data clock signal DCLK, with R, G, B components each 1-bit, when 72-bit display control data (24-bit for R, G and B components respectively, 16-bit for grayscale data, 8-bit for current gain data, that is, the number of bits of grayscale data is greater than the number of bits of current gain data) is collected, then the data clock signal DCLK and the latch signal LE transmit the 3*16 bits grayscale data plus 3*8 bits current gain data contained in the 72-bit display control data in the shift register circuit 111 to the grayscale data storage region 131 and the current gain data storage region 133 in the cache circuit 13 respectively through a combined command (generally, the latch signal contains a rising edge of the data clock signal DCLK).

The sizes of the grayscale data storage region 131 and the current gain data storage region 133 are associated with the number of output channels and scanning lines supported by the display drive circuit 10. For example, the display drive circuit that supports 96 output channels (32 output channels for R, G, and B respectively) and 64 scanning lines, the grayscale data storage region 131 of which is 96*16 bits*64=96 Kb, and the current gain data storage region 133 of which is 96*8 bits*64=48 Kb. At the same time, since the cache circuit 13 of the display drive circuit 10 is operated in a ping-pong mode, that is, the grayscale data display uses the complete grayscale data of the previous frame, and the current frame is buffered for data input, so the sizes of the grayscale data storage region 131 and the current gain data storage region 133 are 192 Kb and 96 Kb respectively, which are used to store two complete frames of grayscale data and current gain data.

In order to display synchronously with the display data displayed in the front-end video source, the display drive circuit 10 also has a corresponding synchronous display processing inside. When the command processing circuit 12 receives a Vsync command (which is also a combination command of the latch signal LE containing the number of rising edges of the data clock signal DCLK, generally 2-3), the display drive circuit 10 will switch the ping-pong data in the cache circuit 13, and the display control data (including grayscale data and current gain data) being completed in the last frame caching is switched to be read and output, and the storage sub-region of the displayed display control data is switched to be coupled with the shift register circuit 111 to receive new display control data, and the Vsync command will reset the grayscale clock count value of the counter 172 that counts the pulse of the grayscale clock signal GCLK generated by the frequency multiplication circuit 171.

Before the grayscale display is really started, the display drive circuit 10 needs to configure the operating mode, global current gain and other operating states according to the register data received by the command processing circuit 12 (such as the data written in the configuration register via the shift register circuit 111); at this time, the required configuration contents include the dispersion mode of grayscale data, the grayscale depth to be achieved, the global current gain, etc. The register configuration is also distinguished by the combination command of different data clock signals DCLK and latch signals LE.

After the configuration is completed, the display drive circuit 10 starts to realize the grayscale. When an LED light point is to be lighted up, and where the line drive current in the periphery is provided, the display drive circuit 10 needs to control the ON/OFF of the output channel DOUT [95:0] according to the display control data of different lines to complete the lighting up of the LED light points. However, in order to distinguish the grayscale data, the size of the output current of the output channel and the duration of turning on of the output channel need to be related. For example, in order to realize the grayscale data of the red components of 1000 grayscale value and 2000 grayscale value, if the current of both is the same, such as 10 mA, the realization of the grayscale data of 1000 grayscale value using the PWM mode requires 1000 grayscale clock signal cycles, the grayscale clock signal here is the GCLK in FIG. 1B, and the same realization of the grayscale data of 2000 grayscale value requires 2000 grayscale clock signal cycles. In this case, the different grayscale data will be converted to display the lighting up time of different time lengths; in the embodiment, through the common control mode of current gain data and grayscale data, the switching state of the output channel DOUT [95:0] of the display drive circuit 10 is controlled by the grayscale data and the grayscale clock count value, while the maximum brightness of the actual LED light point is controlled by the current gain data, and the controlling of the current source 151 of each channel of the display drive circuit 10 is acted by the external resistance and the internal configured resistance together, and the external resistance is fixed after the LED display board is determined, so the lighting brightness of LED light points can be controlled by the way of global current gain and current gain data. As mentioned in the above example, in order to achieve the grayscale data with 1000 grayscale value, a 10 mA current can be selected to light up the time of 1000 grayscale clock signal cycles. The current gain data collaborative control method proposed in the embodiment provides a new lighting up method. The same benchmark is to achieve the display effect of the grayscale data with 1000 grayscale value, the current can be reduced and the grayscale data can be improved to achieve the same effect as the original 10 mA and 1000 grayscale clock signal cycles, for example, the current can be reduced to 5 mA and the number of grayscale clock signal cycles can be increased to 2000 grayscale clock signal cycles, which has effect being similar to the previous one. Similarly, the current data can be reduced to 8 mA, and the number of cycles of the lighted grayscale clock signal can be increased to 1200, which can be consistent in effect. Specifically, the converting of achievement method can be accurately achieved though the achievement relationship between the lighting up effect of the current gain data and the grayscale data.

Furthermore, when using the PWM mode to realize the grayscale, the grayscale dispersion algorithm is used to display the grayscale data in groups, which can improve the refresh rate when realizing the grayscale, and also can prevent the problem that the low grayscale cannot be realized when the refresh rate is not an integer plurality of the grayscale clock signal cycle.

In summary, by designing the display drive circuit 10, the embodiment of the present application can obtain the grayscale data and current gain data, the duration of turning on of each channel current source 151 based on the grayscale data can be controlled, and the output current of each channel current source 151 based on the current gain data can be controlled, therefore the dynamic adjustment of channel current can be realized. In this way, the grayscale data can be improved by reducing the output current (the drive current of the corresponding display point), that is, the display bit depth can be improved. Moreover, since the display effect of the LED display device is related to the refresh rate and the drive current of each grayscale, the grayscale refresh rate under low brightness and low grayscale can be effectively improved by reducing the drive current of display points, such as LED light points, and increasing grayscale data at low grayscale. In addition, by reducing the output current and increasing the grayscale data, the desired brightness value can be accurately obtained, thereby improving the display accuracy of the entire LED display device under low grayscale, so as to solve the problem of uneven grayscale transition under low grayscale.

The Second Embodiment

Figure 2:
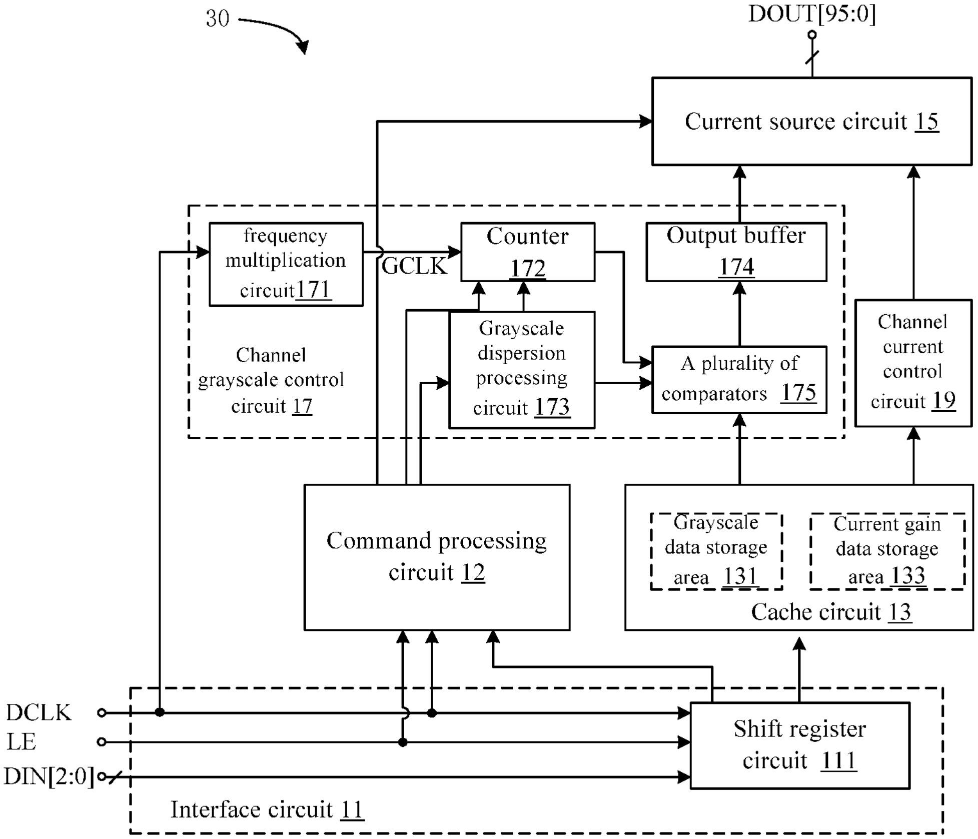
FIG. 2 is the specific structural schematic diagram of another display drive circuit provided by an embodiment of the present application.

FIG. 2 is a specific structural schematic diagram of another display drive circuit 30 provided in the embodiment of the present application. As shown in FIG. 2, the circuit structure of the display drive circuit 30 is basically the same as that of the display drive circuit 10 shown in FIGS. 1A and 1B, including: an interface circuit 11, a command processing circuit 12, a cache circuit 13, a current source circuit 15, a channel grayscale control circuit 17, a channel current control circuit 19; the channel grayscale control circuit 17 includes: a frequency multiplication circuit 171, a counter 172, a grayscale dispersion processing circuit 173, an output buffer 174, and a plurality of comparators 175. The connection relationship between these circuits and their respective structures and functions can be referred to the relevant description in the first embodiment above, and which will not be repeated here.

The difference is that the interface circuit 11 of the display drive circuit 30 in the embodiment includes a shift register circuit 111 and is used to access a data clock signal DCLK, a latch signal LE, a serial data DIN [2:0] and a second clock signal CLK different from the data clock signal DCLK; the shift register circuit 111 is used to receive the serial data DIN [2:0] to obtain the plurality of grayscale data and the plurality of current gain data, and to receive the controlling of the data clock signal DCLK and the latch signal LE; the command processing circuit 12 is electrically coupled with the shift register circuit 111 and receives the controlling of the data clock signal DCLK and the latch signal LE; the cache circuit 13 is electrically coupled with the shift register circuit 111 to obtain the plurality of grayscale data and the plurality of current gain data; and the channel grayscale control circuit 17 receives the controlling of the second clock signal CLK. The frequency multiplication circuit 171 of the embodiment uses another clock signal CLK that is not used for the data clock signal DCLK as the input clock signal to generate the grayscale clock signal GCLK, which makes the generation of the grayscale clock signal GCLK no longer limited to the data clock signal DCLK, and improves the flexibility of the generation of the grayscale clock signal GCLK. In addition, it is worth mentioning that the clock signal CLK can be generated by an external crystal oscillator circuit.

The Third Embodiment

Figure 3:
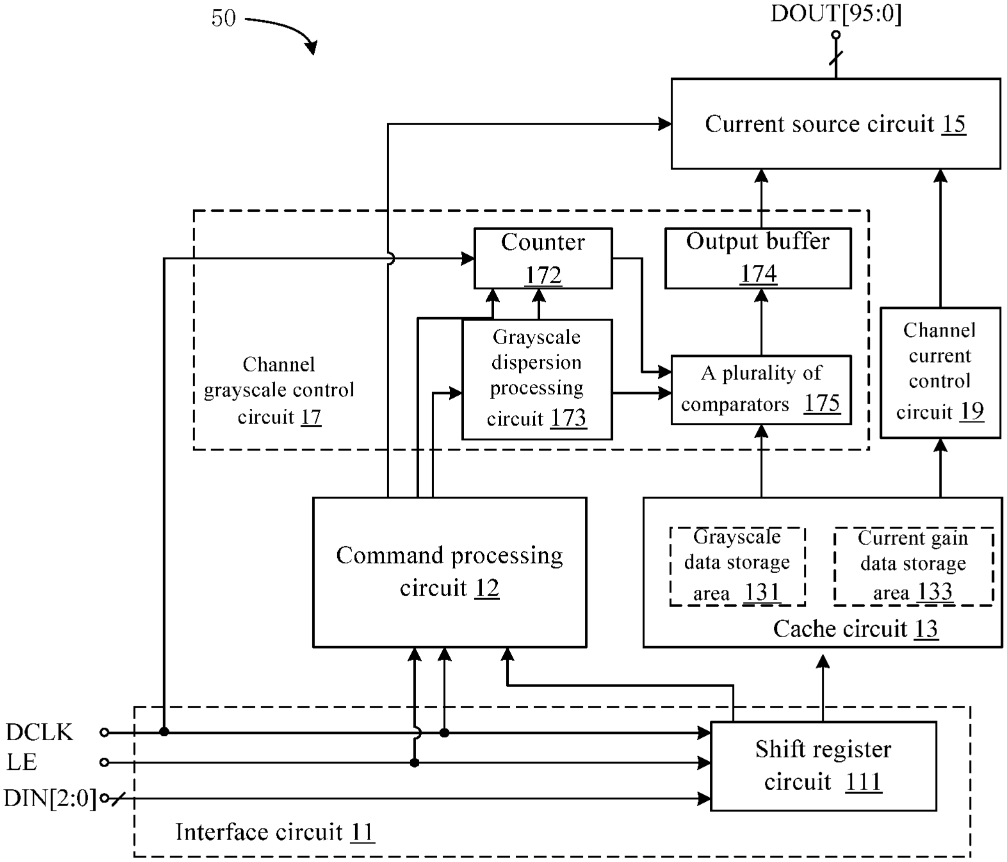
FIG. 3 is the specific structural schematic diagram of another display drive circuit provided by an embodiment of the present application.

FIG. 3 is a specific structural schematic diagram of another display drive circuit 50 provided in the embodiment of the present application. As shown in FIG. 3, the internal circuit structure of the display drive circuit 50 is basically the same as that of the display drive circuit 10 shown in FIGS. 1A and 1B, including the interface circuit 11, the command processing circuit 12, the cache circuit 13, the current source circuit 15, the channel grayscale control circuit 17 and the channel current control circuit 19; the connection relationship between these circuits and their respective structures and functions can be referred to the relevant description in the first embodiment above, and which will not be repeated here.

The difference is that the channel grayscale control circuit 17 in the display drive circuit 50 in the embodiment includes a counter 172, a grayscale dispersion processing circuit 173, an output buffer 174, and a plurality of comparators 175, that is, the frequency multiplication circuit 171 is omitted. Furthermore, the embodiment shows that the interface circuit 11 in the display drive circuit 50 includes a shift register circuit 111 and is used to access the data clock signal DCLK, the latch signal LE, the serial data DIN [2:0] and the grayscale clock signal GCLK different from the data clock signal DCLK; the shift register circuit 111 is used to receive the serial data DIN [2:0] to obtain the plurality of grayscale data and the plurality of current gain data, and to receive the controlling of the data clock signal DCLK and the latch signal LE; the command processing circuit 12 is electrically coupled with the shift register circuit 111 and receives the controlling of the data clock signal DCLK and the latch signal LE; the cache circuit 13 is electrically coupled with the shift register circuit 111 to obtain the plurality of grayscale data and the plurality of current gain data; and the channel grayscale control circuit 17 receives the controlling of the grayscale clock signal GCLK. The channel grayscale control circuit 17 of the embodiment uses an external grayscale clock signal GCLK, so the frequency multiplication circuit 171 can be omitted.

The Fourth Embodiment

Figure 4:
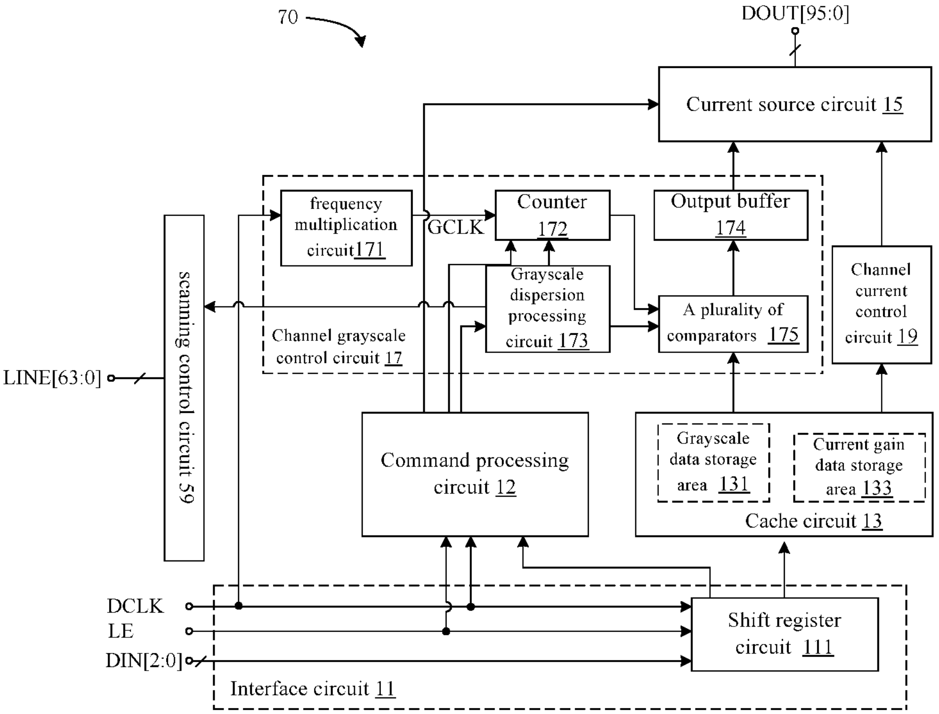
FIG. 4 is the specific structural schematic diagram of another display drive circuit provided by an embodiment of the present application.

FIG. 4 is a specific structural schematic diagram of another display drive circuit 70 provided in the embodiment of the present application. As shown in FIG. 4, the circuit structure of the display drive circuit 70 is basically the same as that of the display drive circuit 10 shown in FIGS. 1A and 1B, including: an interface circuit 11, a command processing circuit 12, a cache circuit 13, a current source circuit 15, a channel grayscale control circuit 17, and a channel current control circuit 19. The channel grayscale control circuit 17 includes a frequency multiplier circuit 171, a counter 172, a grayscale dispersion processing circuit 173, an output buffer 174, and a plurality of comparators 175. The connection relationship between these circuits and their respective structures and functions can be referred to the relevant description in the first embodiment above, and which will not be repeated here.

The difference is that the display drive circuit 70 of the embodiment also includes: a scanning control circuit 59 electrically coupled with the grayscale dispersion processing circuit 173 in the channel grayscale control circuit 17 to generate a plurality of row scanning signals in sequence, for example, having 64 output channels LINE [63:0] to output 64 row scanning signals in sequence. The embodiment integrates the scanning control circuit 59 into the display drive circuit 70, which can effectively improve the integration of the display drive circuit 70 and reduce the complexity of PCB design when designing LED display boards. As for the working principle of the scanning control circuit 59, for example, since the grayscale of the display drive circuit 70 is realized through the coordinated control of the grayscale dispersion processing circuit 173 and the counter 172, for example, after the grayscale dispersion algorithm is turned on, each time the set number is realized, such as 256 grayscale clock signal cycles, the row switching starts, it is necessary to notify the scanning control circuit 59 to perform the row switching operation, since the grayscale data in the display drive circuit 70 is stored in order, so it is also implemented in the scanning order. At this time, the scanning control circuit 59 (for example, from the grayscale dispersion processing circuit 173) can perform the accumulation operation and the resetting operation after receiving a simple logic to complete the output of the scanning signal.

The Fifth Embodiment

Figure 5:
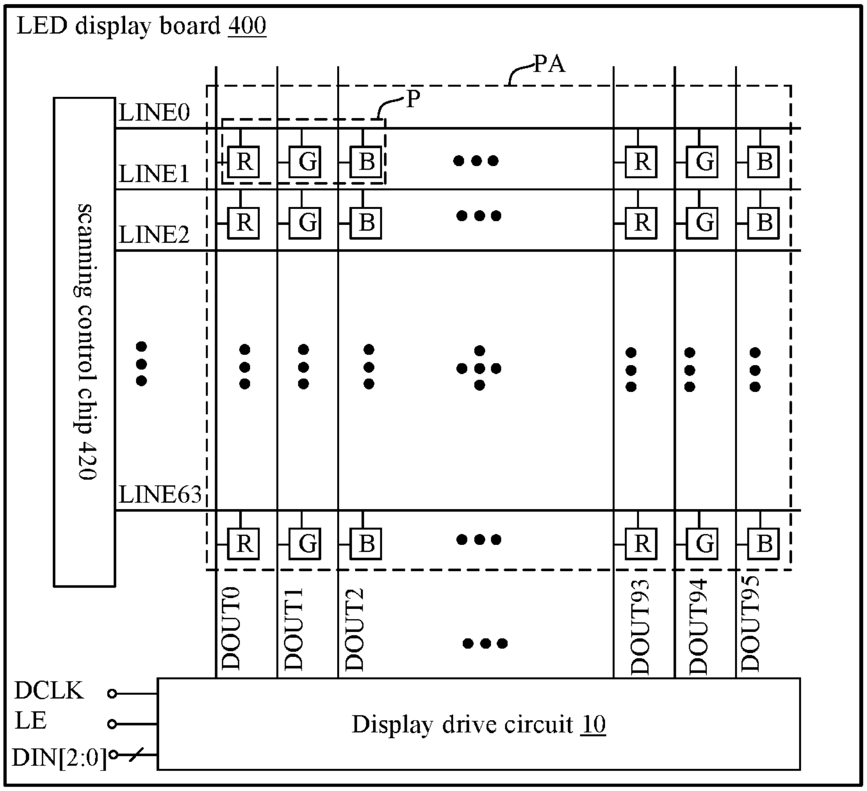
FIG. 5 is a partial structural schematic diagram of an LED display board in an embodiment of the present application.

FIG. 5 is a partial structural schematic diagram of an LED display board provided by the embodiment of the application. As shown in FIG. 5, the LED display board 400 includes a pixel array PA, a display drive circuit 10, and a scanning control chip 420.

The pixel array PA includes 32 columns of pixels P, and each pixel P includes a number of different color LED, such as R, G, B three primary color LED light points, so the pixel array PA has 96 columns of LED light points. The 96 columns of LED light points are electrically coupled with 96 output channels DOUT0~DOUT95 of the display drive circuit 10, and the pixels P in each column are electrically coupled with three adjacent output channels of the display drive circuit 10. Furthermore, the pixel array PA includes 64 rows of pixels P, which are electrically coupled with 64 output channels LINE0~LINE63 of the scanning control chip 420.

The scanning control chip 420 of the embodiment, for example, includes a row decoding chip, which can cooperate with the display drive circuit 10 to generate 64 row scanning signals (or scanning drive signals) in sequence in each round of 64 scanning. It should be noted that the output channels of the scanning control chip 420 in the embodiment are not limited to 64, but can also be other numbers, such as 32. The specific number can be determined according to the actual application needs.

In addition, the display drive circuit 10 of the embodiment receives the inputs of the data clock signal DCLK, the serial data DIN [2:0] and the latch signal LE.

The Sixth Embodiment

Figure 6:
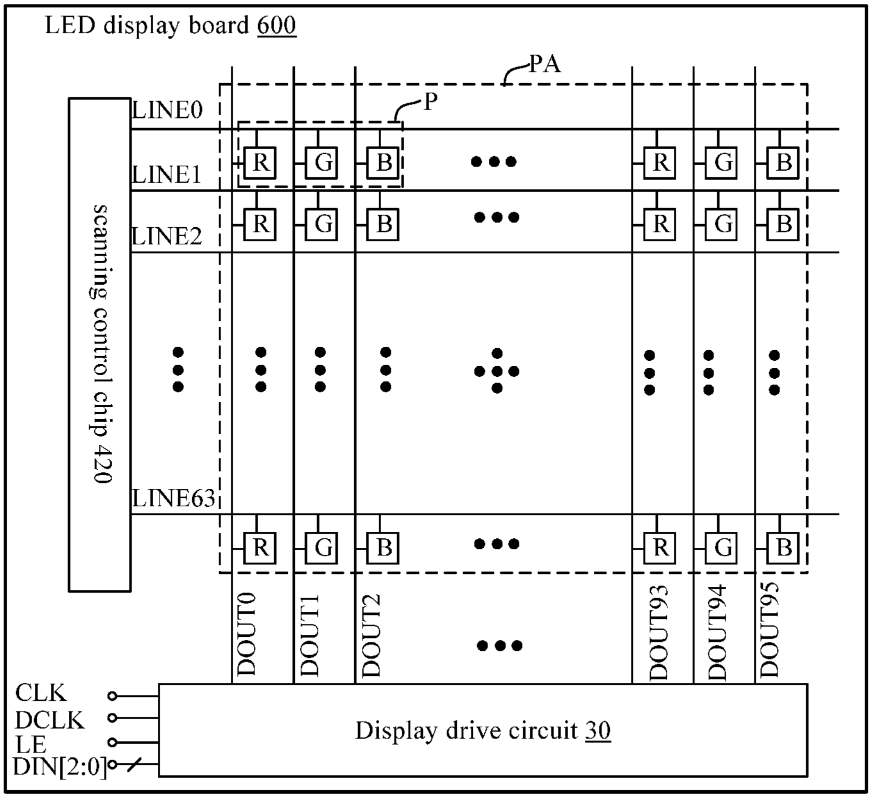
FIG. 6 is a partial structural schematic diagram of another LED display board in an embodiment of the present application.

FIG. 6 is a partial structural schematic diagram of another LED display board provided by the embodiment of the present application. As shown in FIG. 6, the LED display board 600 includes a pixel array PA, a display drive circuit 30, and a scanning control chip 420.

The pixel array PA includes 32 columns of pixels P, and each pixel P includes a number of different color LED, such as R, G, B three primary color LED light points, so the pixel array PA has 96 columns of LED light points. The 96 columns of LED light points are electrically coupled with 96 output channels DOUT0~DOUT95 of the display drive circuit 30, and the pixels P in each column are electrically coupled with three adjacent output channels of the display drive circuit 30. Furthermore, the pixel array PA includes 64 rows of pixels P, which are electrically coupled with 64 output channels LINE0~LINE63 of the scanning control chip 420.

The scanning control chip 420 of the embodiment, for example, includes a row decoding chip, which can cooperate with the display drive circuit 30 to generate 64 row scanning signals (or scanning drive signals) in sequence in each round of 64 scanning. It should be noted that the output channels of the scanning control chip 420 in the embodiment are not limited to 64, but can also be other numbers, such as 32. The specific number can be determined according to the actual application needs.

In addition, the display drive circuit 30 of the embodiment receives the inputs of the data clock signal DCLK, the serial data DIN [2:0] and the latch signal LE, and the second clock signal CLK for generating the grayscale clock signal GCLK.

The Seventh Embodiment

Figure 7:
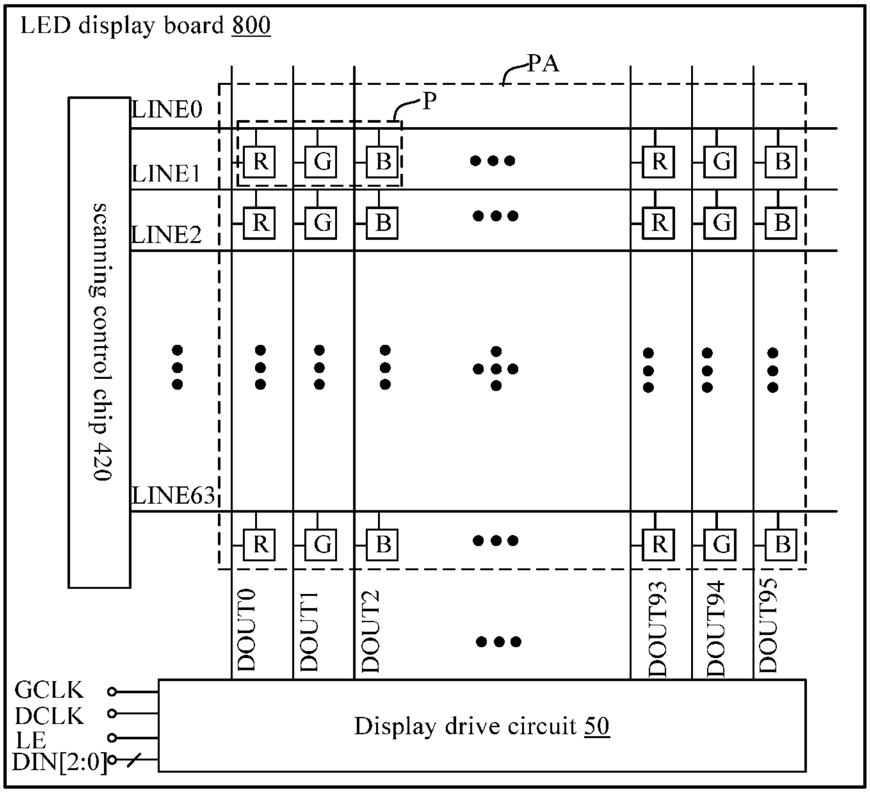
FIG. 7 is a partial structural schematic diagram of another LED display panel in an embodiment of the present application.

FIG. 7 is a partial structural schematic diagram of further LED display board provided by the embodiment of the present application. As shown in FIG. 6, the LED display board 600 includes a pixel array PA, a display drive circuit 50, and a scanning control chip 420.

The pixel array PA includes 32 columns of pixels P, and each pixel P includes a number of different color LED, such as R, G, B three primary color LED light points, so the pixel array PA has 96 columns of LED light points. The 96 columns of LED light points are electrically coupled with 96 output channels DOUT0~DOUT95 of the display drive circuit 50, and the pixels P in each column are electrically coupled with three adjacent output channels of the display drive circuit 50. Furthermore, the pixel array PA includes 64 rows of pixels P, which are electrically coupled with 64 output channels LINE0~LINE63 of the scanning control chip 420.

The scanning control chip 420 of the embodiment, for example, includes a row decoding chip, which can cooperate with the display drive circuit 50 to generate 64 row scanning signals (or scanning drive signals) in sequence in each round of 64 scanning. It should be noted that the output channels of the scanning control chip 420 in the embodiment are not limited to 64, but can also be other numbers, such as 32. The specific number can be determined according to the actual application needs.

In addition, the display drive circuit 50 of the embodiment receives the inputs of data clock signal DCLK, serial data DIN [2:0], latch signal LE and grayscale clock signal GCLK.

The Eighth Embodiment

Figure 8:
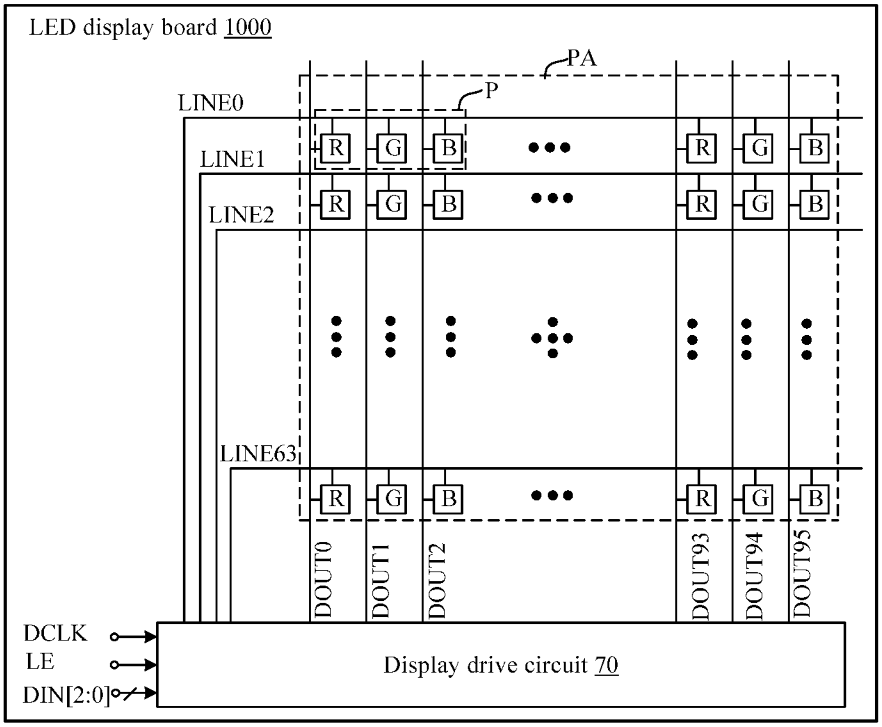
FIG. 8 is a partial structural schematic diagram of another LED display board in an embodiment of the present application.

FIG. 8 is a partial structural schematic diagram of yet LED display board provided by the embodiment of the present application. As shown in FIG. 8, the LED display board 1000 includes a pixel array PA and a display drive circuit 70.

The pixel array PA includes 32 columns of pixels P, and each pixel P includes a number of different color LED, such as R, G, B three primary color LED light points, so the pixel array PA has 96 columns of LED light points. The 96 columns of LED light points are electrically coupled with 96 output channels DOUT0~DOUT95 of the display drive circuit 70, and the pixels P in each column are electrically coupled with three adjacent output channels of the display drive circuit 70. Furthermore, the pixel array PA includes 64 rows of pixels P, which are electrically coupled with 64 output channels LINE0~LINE63 of the display drive circuit 70.

The display drive circuit 70 of the embodiment is integrated with a scanning control circuit 59 (as shown in FIG. 4), which can generate 64 row scanning signals in sequence (or scanning driving signals) in each round of 64 scanning. It should be noted that the output channels of the row scanning signal of the display drive circuit 70 in the embodiment are not limited to 64, but can also be other numbers, such as 32. The specific number can be determined according to the actual application needs.

The Ninth Embodiment

Figure 9:
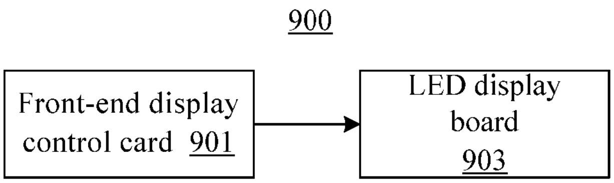
FIG. 9 is a structural schematic diagram of a display device in an embodiment of the present application.

FIG. 9 is the structural schematic diagram of a display device provided in the embodiment of the present application. As shown in FIG. 9, the display device 900 includes a front-end display control card 901 and an LED display board 903.

The front-end display control card 901 is used to output display control data including grayscale data and current gain data. For example, which uses a hardware structure similar to a receiving card, a scanning card or a module controller that is mature in the field of LED display control technology, that is, it uses programmable logic devices such as Field Programmable Gate Array (FPGA) devices as image processors. However, the image processor of the embodiment can directly output the display control data including grayscale data and current gain data, or add FPGA devices or Application Specific Integrated Circuit (ASIC) devices at the rear-end of the image processor to convert the grayscale data output by the image processor into the display control data including grayscale data and current gain data.

The LED display board 903 can use the LED display board 400, 600, 800 or 1000 described in the fifth embodiment, the sixth embodiment, the seventh embodiment or the eighth embodiment, and the display drive circuit included therein is electrically coupled with the front-end display control card 901 to receive the display control data to achieve image display.

It is worth noting that the display device 900 of the embodiment can be an LED display box containing a front-end display control card 901 and one or more LED display boards 903, but it is only an example and is not intended to limit the embodiments of the present application.

The display device 900 of the embodiment can realize the dynamic adjustment of channel current, which is conducive to improve the display bit depth, improving the grayscale refresh rate under low brightness and low grayscale, and improving the display accuracy under low grayscale of the entire LED display device to solve the problem of uneven grayscale transition under low brightness and low grayscale.

The Tenth Embodiment

Figure 10:
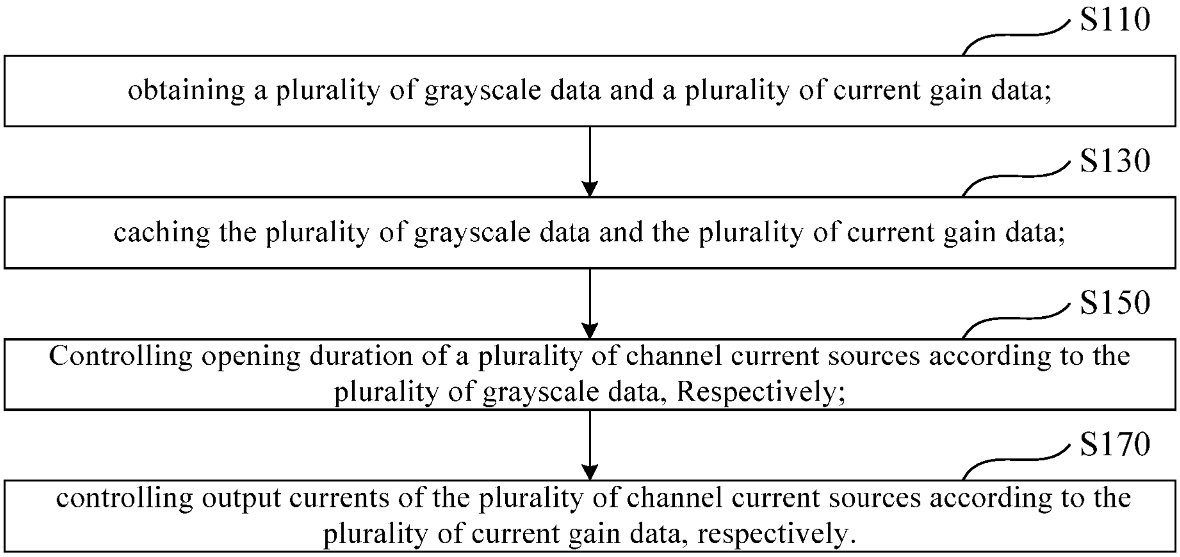
FIG. 10 is a schematic flowchart of a display drive method in an embodiment of the present application.

FIG. 10 is a schematic flowchart of a display drive method provided in the embodiment of the present application. As shown in FIG. 10, the display drive method of the embodiment includes the following steps, for example:

S110, obtaining a plurality of grayscale data and a plurality of current gain data;

S130, caching the plurality of grayscale data and the plurality of current gain data;

S150, respectively controlling duration of turning on of a plurality of channel current sources according to the plurality of grayscale data; and

S170, respectively controlling output currents of the plurality of channel current sources according to the plurality of current gain data.

The specific details of the steps S110 to S170 can be referred to the relevant description of the display drive circuit 10 of the first embodiment, and which will not be repeated here. Furthermore, the display drive method of the embodiment can realize the dynamic adjustment of channel current, which is conducive to improving the display bit depth, improving the grayscale refresh rate under low brightness and low grayscale, and improving the display accuracy under low grayscale of the entire LED display device to solve the problem of uneven grayscale transition under low brightness and low grayscale.

As an embodiment of the present application, the step S150 includes: (i) receiving a grayscale clock signal and generating a grayscale clock count value under controlling of the grayscale clock signal; (ii) controlling a counting operation of a counter and generating a grayscale grouping control signal based on a grayscale dispersion algorithm; and (iii) respectively obtaining the plurality of grayscale data, and generating a plurality of grayscale display control signals to be transmitted to the plurality of channel current sources respectively under controlling of the grayscale clock count value and the grayscale grouping control signal, to control the duration of turning on of the plurality of channel current sources. In the embodiment, the use of the grayscale dispersion processing circuit is conducive to evenly disperse the high grayscale part and the low grayscale part, so that in some scenes where the grayscale realization is incomplete, and most grayscale can be realized as much as possible.

As an embodiment of the present application, the step S150 further includes: performing a frequency multiplication processing onto an input clock signal to generate the grayscale clock signal. In the embodiment, the use of frequency multiplication circuit is conducive to increase the flexibility of the generation of the grayscale clock signal.

As an embodiment of the present application, the step S170 includes: respectively controlling the output currents of the plurality of channel current sources according to a plurality of point-by-point current gain data. The using of point-by-point current gain data in the embodiment can enable the current source of the same channel to use the current gain data corresponding to the different display points when different display points (such as LED light points) is driven, which is conducive to improving the accuracy of current dynamic adjustment.

As an embodiment of the present application, the step S130 includes: caching point-by-point grayscale data frame-by-frame in a ping-pong storage mode; and caching point-by-point current gain data frame-by-frame in the ping-pong storage mode. In the embodiment, the grayscale data and the current gain data are stored in a ping-pong storage mode, which is conducive to improving the processing speed and performance of the display drive circuit.

As an embodiment of the present application, the step S170 includes: respectively controlling the output currents of the plurality of channel current sources according to a plurality of channel-by-channel current gain data. In an embodiment of the present application, the using of the channel-by-channel current gain data, so that the current gain data used by a same channel current source in the plurality of channel current sources in different display frames are different. The using of the channel-by-channel circuit gain data in the embodiment can at least realize frame-by-frame current dynamic adjustment.

In addition, it can be understood that the above embodiments are only illustrative examples of the present application. On the premise that the technical features are not conflicting, the structure is not contradictory, and the invention purpose of the present application is not violated, the technical solutions of each embodiment can be combined and used together at will.

Furthermore, it is worth noting that the foregoing embodiments of the present application are described by taking as an example that a single display driver circuit can achieve the grayscale realization of plurality of color components, but the embodiments of the present application are not limited to this, and a single display driver circuit can also be designed to only achieve the grayscale realization of a single color component, so that the grayscale data of R, G, and B color components can be realized by using three display driver circuits respectively.

In addition, it is worth noting that in several embodiments provided in the present application, it should be understood that the disclosed system, device and method can be implemented in other ways. For example, the device embodiments described above are only schematic, for example, the division of units is only a logical function division, and there can be another division method when actually implemented, for example, plurality of units or components can be combined or integrated into another system, or some features can be ignored or not implemented. On the other hand, the mutual coupling or direct coupling or communication connection shown or discussed can be indirect coupling or communication connection through some interfaces, devices or units, and can be electrical, mechanical or other forms.

The units described as separate units may or may not be physically separated, and the units displayed as units may or may not be physical units, that is, they may be located in one place, or they may also be distributed to plurality of network units. Part or all of the units can be selected according to actual needs to achieve the purpose of the embodiment.

In addition, each functional unit in each embodiment of the present application can be integrated in a processing unit, or each unit can exist physically independently, or two or more units can be integrated in a unit. The integrated units can be realized in the form of hardware or hardware plus software functional units.

The integrated unit in the form of software functional unit can be stored in a computer readable storage medium. The above software functional unit is stored in a storage medium, and includes several instructions to enable a computer device (which can be a personal computer, a server, or a network device, etc.) to perform some steps of the methods of various embodiments of the present application. The aforementioned storage media include: a USB flash disk, a mobile hard disk, a read only memory (ROM), a random access memory (RAM), a magnetic disc or an optical disc and other media that can store program codes.

Finally, it should be noted that the above embodiments are only used to illustrate the technical solution of the present application, not to limit the present application; Although the present application has been described in detail with reference to the preceding embodiments, those skilled in the art should understand that they can still modify the technical solutions recorded in the preceding embodiments, or equivalent replace some of the technical features; However, these modifications or substitutions do not make the essence of the corresponding technical solutions separate from the spirit and scope of the technical solutions of the embodiments of the present application.

INDUSTRIAL PRACTICABILITY

In the present application, by designing the display drive circuit, the embodiment of the present application can obtain the grayscale data and current gain data, the duration of turning on of each channel current source based on the grayscale data can be controlled, and the output current of each channel current source based on the current gain data can be controlled, therefore the dynamic adjustment of channel current can be realized. In this way, the grayscale data can be improved by reducing the output current (the drive current of the corresponding display point), that is, the display bit depth can be improved. Moreover, since the display effect of the LED display device is related to the refresh rate and the drive current of each grayscale, the grayscale refresh rate under low brightness and low grayscale can be effectively improved by reducing the drive current of display points, such as LED light points, and increasing grayscale data at low grayscale. In addition, by reducing the output current and increasing the grayscale data, the desired brightness value can be accurately obtained, thereby improving the display accuracy of the entire LED display device under low grayscale, so as to solve the problem of uneven grayscale transition under low grayscale.

What is claimed is:

1. A display drive circuit, comprising:

an interface circuit, configured for acquiring a plurality of grayscale data and a plurality of current gain data;

a command processing circuit, electrically coupled with the interface circuit;

a cache circuit, electrically coupled with the interface circuit and configured for caching the plurality of grayscale data and the plurality of current gain data;

a current source circuit, electrically coupled with the command processing circuit and comprising a plurality of channel current sources;

a channel grayscale control circuit, electrically coupled with the command processing circuit, the cache circuit and the current source circuit, and configured for respectively controlling duration of turning on of the plurality of channel current sources according to the plurality of grayscale data; and a channel current control circuit, electrically coupled with the cache circuit and the current source circuit, and configured for respectively controlling output currents of the plurality of channel current sources according to the plurality of current gain data;

wherein the channel current control circuit comprises a plurality of channel current gain adjusters, and the plurality of channel current gain adjusters are respectively electrically coupled with the plurality of channel current sources and respectively receive controlling of the plurality of current gain data.

2. The display drive circuit according to claim 1, wherein the interface circuit comprises a shift register circuit and is configured for accessing a data clock signal, a latch signal and a serial data; the shift register circuit is configured for receiving the serial data to obtain the plurality of grayscale data and the plurality of current gain data and to receive controlling of the data clock signal and the latch signal; the command processing circuit is electrically coupled with the shift register circuit and receives controlling of the data clock signal and the latch signal; the cache circuit is electrically coupled with the shift register circuit to obtain the plurality of grayscale data and the plurality of current gain data; and the channel grayscale control circuit receives controlling of the data clock signal.

3. The display drive circuit according to claim 1, wherein the channel grayscale control circuit comprises:

a counter, electrically coupled with the command processing circuit and configured for receiving a grayscale clock signal and generating a grayscale clock count value under controlling of the grayscale clock signal;

a grayscale dispersion processing circuit, electrically coupled with the command processing circuit and the counter, and configured for receiving controlling of the command processing circuit to control a counting operation of the counter and generate a grayscale grouping control signal;

an output buffer, electrically coupled with the plurality of channel current sources of the current source circuit; and a plurality of comparators, electrically coupled with the cache circuit, the counter, the grayscale dispersion processing circuit and the output buffer, and configured for obtaining the plurality of grayscale data from the cache circuit respectively, and generating a plurality of grayscale display control signals under controlling of the grayscale clock count value and the grayscale grouping control signal, and the plurality of grayscale display control signals are transmitted to the plurality of channel current sources through the output buffer.

4. The display drive circuit according to claim 3, wherein the channel grayscale control circuit further comprises a frequency multiplication circuit electrically coupled with the counter and configured for generating the grayscale clock signal and transmitting the grayscale clock signal to the counter.

5. The display drive circuit according to claim 1, wherein the current source circuit further comprises one or more color component global current gain adjusters, and when the current source circuit comprises more than one color component global current gain adjusters, each color component global current gain adjuster is electrically coupled with a plurality of channel current sources configured for carrying a same color sub-pixel in the plurality of channel current sources; and when the current source circuit comprises one color component global current gain adjuster, the color component global current gain adjuster is electrically coupled with a plurality of channel current sources configured for carrying all color sub-pixels in the plurality of channel current sources.

6. The display drive circuit according to claim 1, wherein the interface circuit comprises a shift register circuit and is configured for accessing a data clock signal, a latch signal, a serial data and a second clock signal different from the data clock signal; the shift register circuit is configured for receiving the serial data to obtain the plurality of grayscale data and the plurality of current gain data and to receive controlling of the data clock signal and the latch signal; the command processing circuit is electrically coupled with the shift register circuit and receives controlling of the data clock signal and the latch signal; the cache circuit is electrically coupled with the shift register circuit to obtain the plurality of grayscale data and the plurality of current gain data; and the channel grayscale control circuit receives controlling of the second clock signal.

7. The display drive circuit according to claim 1, further comprising: a scanning control circuit electrically coupled with the channel grayscale control circuit and configured for generating a plurality of row scanning signals in sequence.

8. The display drive circuit according to claim 1, wherein the cache circuit comprises a grayscale data storage region and a current gain data storage region, the grayscale data storage region is configured for caching the plurality of grayscale data, and the current gain data storage region is configured for caching the plurality of current gain data.

9. The display drive circuit according to claim 8, wherein the grayscale data storage region comprises two storage sub-regions configured for caching grayscale data frame-by-frame in a ping-pong storage mode, and the current gain data storage region comprises two storage sub-regions configured for caching current gain data frame-by-frame in the ping-pong storage mode.

10. The display drive circuit as claimed in claim 1, wherein the interface circuit, the command processing circuit, the cache circuit, the current source circuit, the channel grayscale control circuit, and the channel current control circuit are integrated in a same chip.

11. The display drive circuit according to claim 1, wherein the plurality of current gain data is point-by-point current gain data, so that a same channel current source in the plurality of channel current sources uses the current gain data corresponding to different display points when the different display points are driven.

12. The display drive circuit according to claim 1, wherein the plurality of current gain data is channel-by-channel current gain data, so that the current gain data used by a same channel current source in the plurality of channel current sources in different display frames are different.

13. A display device, comprising:

a front-end display control card, configured for outputting a plurality of grayscale data and a plurality of current gain data; and an LED display board, comprising:

a pixel array, comprising a plurality of pixel points, wherein each pixel point comprises a plurality of LEDs with different colors; and at least one display drive circuit according, the display drive circuit comprising:

an interface circuit, configured for acquiring a plurality of grayscale data and a plurality of current gain data;

a command processing circuit, electrically coupled with the interface circuit;

a cache circuit, electrically coupled with the interface circuit and configured for caching the plurality of grayscale data and the plurality of current gain data;

a current source circuit, electrically coupled with the command processing circuit and comprising a plurality of channel current sources;

a channel grayscale control circuit, electrically coupled with the command processing circuit, the cache circuit and the current source circuit, and configured for respectively controlling duration of turning on of the plurality of channel current sources according to the plurality of grayscale data; and a channel current control circuit, electrically coupled with the cache circuit and the current source circuit, and configured for respectively controlling output currents of the plurality of channel current sources according to the plurality of current gain data; wherein the channel current control circuit comprises a plurality of channel current gain adjusters, and the plurality of channel current gain adjusters are respectively electrically coupled with the plurality of channel current sources and respectively receive controlling of the plurality of current gain data, wherein the plurality of channel current sources of the display drive circuit are electrically coupled with the pixel array; and wherein the display drive circuit of the LED display board is electrically coupled with the front-end display control card to receive the plurality of grayscale data and the plurality of current gain data.

14. A display drive method, comprising:

obtaining, by an interface circuit, a plurality of grayscale data and a plurality of current gain data;

caching, by a cache circuit electrically coupled with the interface circuit, the plurality of grayscale data and the plurality of current gain data;

controlling, by a channel grayscale control circuit electrically coupled with the cache circuit and a current source circuit, duration of turning on of a plurality of channel current sources according to the plurality of grayscale data, respectively; and controlling, by a channel current control circuit electrically coupled with the cache circuit and the current source circuit, output currents of the plurality of channel current sources according to the plurality of current gain data, respectively; wherein the channel current control circuit comprises a plurality of channel current gain adjusters, and the plurality of channel current gain adjusters are respectively electrically coupled with the plurality of channel current sources and respectively receive controlling of the plurality of current gain data.

15. The display drive method according to claim 14, wherein the step of respectively controlling duration of turning on of a plurality of channel current sources according to the plurality of grayscale data comprises:

receiving a grayscale clock signal and generating a grayscale clock count value under controlling of the grayscale clock signal;

controlling a counting operation of a counter and generating a grayscale grouping control signal based on a grayscale dispersion algorithm; and obtaining, respectively, the plurality of grayscale data, and generating a plurality of grayscale display control signals to be transmitted to the plurality of channel current sources respectively under controlling of the grayscale clock count value and the grayscale grouping control signal, to control the duration of turning on of the plurality of channel current sources.

16. The display drive method according to claim 15, wherein the step of respectively controlling duration of turning on of a plurality of channel current sources according to the plurality of grayscale data further comprises:

performing a frequency multiplication processing onto an input clock signal to generate the grayscale clock signal.

17. The display drive method according to claim 14, wherein the step of respectively controlling output currents of the plurality of channel current sources according to the plurality of current gain data comprises:

controlling the output currents of the plurality of channel current sources according to a plurality of point-by-point current gain data, respectively.

18. The display drive method according to claim 17, wherein the step of caching the plurality of grayscale data and the plurality of current gain data comprises:

caching point-by-point grayscale data frame-by-frame in a ping-pong storage mode; and caching point-by-point current gain data frame-by-frame in the ping-pong storage mode.

19. The display drive method according to claim 14, wherein the step of respectively controlling output currents of the plurality of channel current sources according to the plurality of current gain data comprises:

controlling the output currents of the plurality of channel current sources according to a plurality of channel-by-channel current gain data, respectively.

* * * * *